United States Patent
Hölzel

(10) Patent No.: US 8,100,467 B2
(45) Date of Patent: Jan. 24, 2012

(54) VEHICLE ROOF HAVING ROOF OPENING SYSTEM

(75) Inventor: Dominik Hölzel, Gröbenzell (DE)

(73) Assignee: Webasto AG (Advotec), Stockdorf (DE)

( * ) Notice: Subject to any disclaimer, the term of this patent is extended or adjusted under 35 U.S.C. 154(b) by 0 days.

(21) Appl. No.: 12/990,483

(22) PCT Filed: May 6, 2008

(86) PCT No.: PCT/DE2008/000778
§ 371 (c)(1),
(2), (4) Date: Nov. 11, 2010

(87) PCT Pub. No.: WO2009/135450
PCT Pub. Date: Nov. 12, 2009

(65) Prior Publication Data
US 2011/0049940 A1 Mar. 3, 2011

(51) Int. Cl.
*B60J 7/047* (2006.01)
*B60J 7/057* (2006.01)
(52) U.S. Cl. .............. 296/216.04; 296/216.05; 296/223
(58) Field of Classification Search ............ 296/216.02–216.05, 220.01, 223
See application file for complete search history.

(56) References Cited

U.S. PATENT DOCUMENTS

| | | | | |
|---|---|---|---|---|
| 4,659,140 A | * | 4/1987 | Fuerst et al. | 296/223 |
| 4,893,869 A | * | 1/1990 | Fuerst | 296/216.03 |
| 2007/0210623 A1 | | 9/2007 | Becher et al. | |

FOREIGN PATENT DOCUMENTS

| | | |
|---|---|---|
| DE | 3517636 | * 11/1986 |
| DE | 3532111 A1 | 3/1987 |
| DE | 19958523 C1 | 1/2001 |
| DE | 102005059287 A1 | 6/2007 |
| EP | 1834820 A1 | 9/2007 |
| JP | 58085713 A | 5/1983 |

OTHER PUBLICATIONS

International Search Report for PCT/DE2008/000778 dated May 14, 2009.

* cited by examiner

*Primary Examiner* — Dennis Pedder
(74) *Attorney, Agent, or Firm* — Marshall, Gerstein & Borun LLP

(57) ABSTRACT

A vehicle roof is proposed having a roof opening system (12) which comprises a cover element (16) by means of which a roof opening (14) can be optionally closed or at least partially opened and which interacts, in the closed position, with a separating device which surrounds the roof opening (14) and separates a wet area from a dry area, wherein the cover element (14) comprises, on both sides with respect to a longitudinal central plane of the vehicle, a front, driven sliding element (24) which lies in the dry area and is guided in a first guide device (30), and a rear sliding element (28) which lies in the wet area and is guided in a second guide device (32). According to the invention, the rear sliding elements (28) are actively driven by means of a drive device (46) in a coupling-free fashion with respect to the front sliding elements (24), so that said rear sliding elements (28) move in the second guide devices (32).

12 Claims, 7 Drawing Sheets

VEHICLE ROOF HAVING ROOF OPENING SYSTEM

BACKGROUND OF THE INVENTION

1. Field of the Invention

The invention relates to a vehicle roof having a roof opening system.

2. Related Technology

Such a vehicle roof is known from practice and comprises, in particular, a roof opening system which is embodied as what is referred to as an externally running sun roof. In such a sun roof, a roof opening is optionally closed or opened by means of a cover element which, in order to reach its open position is moved by means of a rear-side fixed roof area. The cover element is provided with a front and rear sliding element on each side of a longitudinal plane of the vehicle. The front sliding elements are each connected to a drive cable which is rigid in compression and is driven by a drive motor. During the opening movement, the rear sliding elements run along passively. The front sliding elements are guided in guide rails which lie in a dry area which is separated from a wet area by a separating device which surrounds the roof opening. The rear sliding elements are guided in guide rails which lie in this wet area. Furthermore, in order to carry out a deployment movement of the cover element during its opening movement, the activation mechanism of the roof opening system comprises what are referred to as auxiliary levers which are guided in corresponding guide rails within the dry area and dip through when the cover element moves back under the separating device which separates the dry area from the wet area. In the rear area of the cover element, two mechanical assemblies are therefore necessary, specifically one mechanical assembly which lies inside the separating device in the dry area and which constitutes the auxiliary lever, and one mechanical assembly to which the movement of the cover element outside the separating element is transmitted and which is arranged in the wet area.

In the roof opening system which is described above, the driven part of the mechanism therefore lies in the dry area. This is due to the fact that a drive motor and the associated electronics are not configured for the wet area, and a seal of the electronics would be expensive and complex. Furthermore, the drive cables are wound with helical rising cables so that a pinion which is driven by the drive motor can engage on said rising cables, and the torque of the drive motor can be converted into a thrust force. The drive cables which are rigid in compression cannot be effectively sealed against water.

In the roof opening system described there is also the disadvantage that the guide rails for the front sliding elements and the guide rails for the rear sliding elements are offset with respect to one another in the transverse direction of the vehicle. This occurs at the expense of the maximum dimensions of the roof opening in the transverse direction of the vehicle. Owing to the necessary protrusions of the cover in front of and behind the separating device between the wet area and the dry area, and owing to the necessary cover openings, the entire roof opening in the respective vehicle between the front-side roof frame area and the rear-side roof frame area is too short to arrange the guide rails of the front sliding elements and the guide rails of the rear sliding elements in a line.

The deployment movement of the cover element into a ventilator position generally occurs in previously known roof opening systems of the type described in the introduction by means of a lever/levers, or carriages with a lever or the like which lie in the region of the cover element rear edge in the dry area since the cover element can only be driven within the main seal or the separating element. As a result, the part of the drive mechanism on the front side of the vehicle has to remain stationary in front of a rear deployment element on the rear side of the vehicle, or the part of the drive mechanism on the front side of the vehicle has to move next to the deployment element on the rear side of the vehicle, which occurs at the expense of the dimensions of the roof opening in the transverse direction of the vehicle, or, as in the prior art described in the introduction, the rear-side deployment element has to move through under the separating element or the main seal, which again occurs at the expense of the head room in the passenger compartment of the vehicle.

Furthermore, the fact that the guide rails which are arranged one behind the other are offset with respect to one another in the transverse direction of the vehicle means that installation space is required which on some occasions is very difficult to provide in vehicle roofs. The overlapping of the rear and of the front guide rails in the longitudinal direction of the vehicle meant that previously it was only possible to provide a reinforcement element which satisfied the minimum requirements and which connected the two roof edges to one another, since such a reinforcement element would otherwise penetrate the main plane of the mechanism. For this reason, in the known designs, the reinforcement element is led past under the guide rails. However, this reinforcement element was previously a very flat design owing to the lack of installation space in the head area, and this in turn occurs at the expense of the flexural rigidity of the reinforcement element.

SUMMARY OF THE INVENTION

The invention makes available a vehicle roof which is of the generic type mentioned in the introduction and which optimizes the transverse dimension of the roof opening and can be implemented in a cost-effective way.

Accordingly, the invention provides a vehicle roof having a roof opening system comprising a cover element by which a roof opening can be optionally closed or at least partially opened and which interacts, in the closed position, with a separating device that surrounds the roof opening and separates a wet area from a dry area, wherein the cover element comprises, on both sides with respect to a longitudinal central plane of the vehicle, a front, driven sliding element that lies in the dry area and is guided in a first guide device, and a rear sliding element that lies in the wet area and is guided in a second guide device, wherein the rear sliding elements are actively driven by a drive device in a coupling-free fashion with respect to the front sliding elements, so that said rear sliding elements move in the second guide devices.

The core of the invention is consequently that not only the front sliding element but also the rear sliding element is coupled to a drive device, with the result that when the cover element moves or opens, both the front sliding elements and the rear sliding elements are driven actively without direct coupling to one another. As a result of the active driving of the rear sliding elements, the auxiliary lever described in the introduction for carrying out the deployment movement of the cover element can be dispensed with, with the result that a guide track or guide device for the auxiliary lever, extending into the fixed roof area arranged on the vehicle-rear-side of the roof opening, can also be dispensed with. It is therefore possible to provide in each case, in comparison to the prior art, a relatively short guide rail for the dry area, that is to say the front sliding elements. The cover element is therefore also driven in the wet area since the rear sliding elements are arranged therein.

In one preferred embodiment of the vehicle roof according to the invention, the rear sliding elements are each connected to a drive cable which is rigid in compression and which is coupled to the drive device. Alternatively, it is also conceivable for the sliding elements to each be coupled to a drive rod or the like, which brings about displacement of the rear sliding element in the assigned second guide device.

In order to achieve synchronization of the movement of the rear and front sliding elements, it is advantageous if the rear sliding elements and the front sliding elements are each driven by means of a common drive motor. It is, of course, also conceivable for the front and rear sliding elements to be each driven with a separate drive motor.

In one expedient embodiment of the vehicle roof according to the invention, the drive motor lies in the dry area, wherein said drive motor has a drive shaft which is guided in a sealed fashion into the wet area in order to drive the rear sliding elements. The drive shaft can also be assigned to a transmission which is coupled to the drive motor.

In order to jointly drive the rear and the front sliding elements by means of this drive motor, a first pinion, which is arranged in the dry area, for driving the front sliding elements, and a second pinion, which is arranged in the wet area for driving the rear sliding elements are preferably seated on the drive shaft, and a rotational seal is arranged between the first pinion and the second pinion. The rotational seal reliably seals off the dry area from the wet area in terms of wetness and dirt.

In one special embodiment of the vehicle roof according to the invention, the front sliding elements and the rear sliding elements are driven at different speeds during the adjustment of the cover element. This has the advantage that the guide devices which are assigned to the rear sliding elements can be made shorter than the guide devices which are assigned to the front sliding elements. However, travel compensation devices then have to be provided for compensating the different movement speeds.

The travel compensation devices can be formed, for example, by guide rails which are formed on the cover element and on each of which a lever element which is connected to the respective rear sliding element is guided. When the cover element moves, these guide rails then carry out a relative movement with respect to the rear guide rails which are fixed to the roof.

The different movement speeds of the mechanism in the dry area and the mechanism in the wet area therefore result in a relative movement between these two mechanisms. This can be achieved, for example, by means of different pinion sizes for the drive cables of the rear sliding elements and of the front sliding elements. The relative movement can therefore also be used for shortening the rear guide devices or dividing them up along multiple guide units which carry out a relative movement with respect to one another. The shortening of the rear guide device shortens the overall length of the mechanism. Shortening the mechanism means that the front and rear guide devices in the edge regions of the roof opening system on both sides can also be respectively positioned in a line.

In addition, by shortening the rear guide devices it is possible to ensure that sliding elements come to a standstill in an area of the vehicle roof in which the design line is still straight. The joint line as an extension of the mechanism can therefore follow the design line unimpeded.

As a result of the rear guide devices being made short it is also possible to arrange a roof reinforcement element in an intermediate space between the first guide devices and the second guide devices, which roof reinforcement element extends in the transverse direction of the vehicle and has a high flexural rigidity. There is therefore sufficient installation space available for this.

The separating device which separates the wet area from the dry area is preferably a sealing profile which is formed on the underside of the cover element or fixed to the roof. However, any other separating devices or sealing devices which separate the dry area from the wet area, such as for example a water groove or the like, are also conceivable.

Furthermore, the rear guide devices can each be provided with a height adjustment device which preferably comprises at least one setting screw and/or one washer. It is therefore possible to adapt the position of the cover element to the fixed roof sections by means of the positioning of the rear guide rails.

Further advantages and advantageous refinements of the subject matter of the invention can be found in the description, the drawing and the patent claims.

BRIEF DESCRIPTION OF THE DRAWINGS

Three exemplary embodiments of a vehicle roof according to the invention are illustrated in a schematically simplified fashion and will be explained in more detail in the following description, in which.

DETAILED DESCRIPTION

Figure 1:
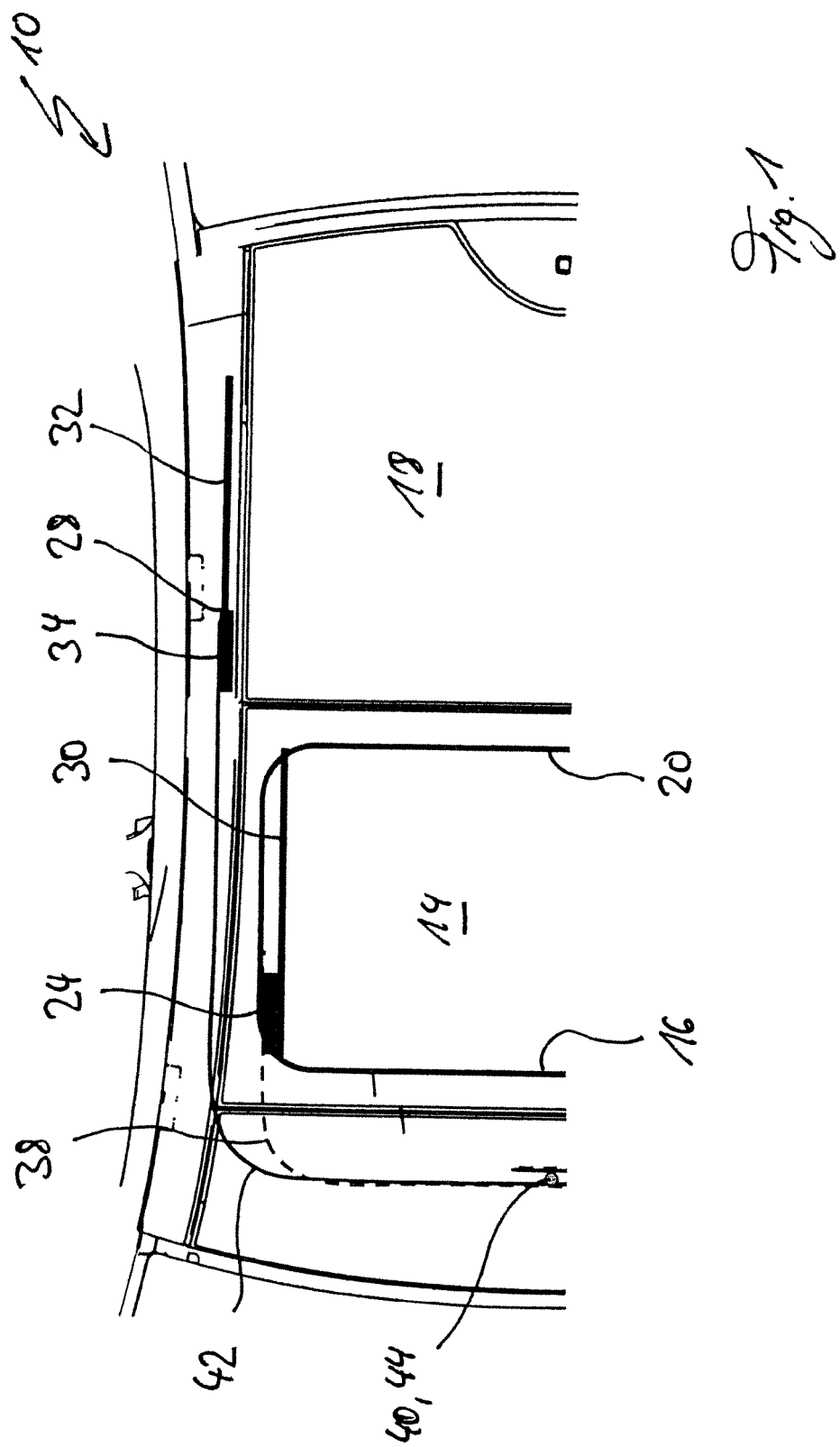
FIG. 1 shows a plan view of a vehicle roof with a roof opening system embodied according to the invention.

FIGS. 1 to 5 illustrate a vehicle roof 10 which is provided with a roof opening system 12 which has a cover element 14 by means of which a roof opening 16 can be optionally closed or at least partially opened, and which is embodied as what is referred to as an externally running sun roof which, during movement into the open position, is consequently moved by means of a vehicle-rear-side fixed roof section 18.

The roof opening system 12 comprises a sealing profile 20 which forms what is referred to as a top seal with which the cover element 14 interacts in the closed position and which separates a dry area T from a wet area N of the roof opening system 12.

The cover element 14 is connected, on both sides with respect to a longitudinal central plane of the vehicle, to a front sliding element 24 via a front deployment lever 22 and to a rear sliding element 28 via a rear deployment lever 26. The front sliding element 24 is guided in a front guide rail 30 which is arranged in the dry area of the roof opening system in the region of the roof opening 16 along the lateral edges thereof. The rear sliding elements 28 are each guided in a rear guide rail 32 which is arranged in an edge area of the fixed roof section 18 which is to the side with respect to the longitudinal central plane of the vehicle, said guide rail 32 consequently lying in the wet area of the roof opening system 12.

The end, facing the rear sliding element 28, of the respective rear deployment lever 26 is connected to a slider 34 which is guided on a guide rail 36 which is fixed to the cover element and also extends in the longitudinal direction of the vehicle.

The front sliding elements 24 are each connected to a first drive cable 38 which is rigid under compression and which is in turn driven by means of a first drive pinion 40 which is arranged in the dry area of the roof opening system 12. The rear sliding elements 28 are each connected to a second drive cable 42 which is driven by a second drive pinion 44 which lies in the wet area of the roof opening system 12.

Figure 5:
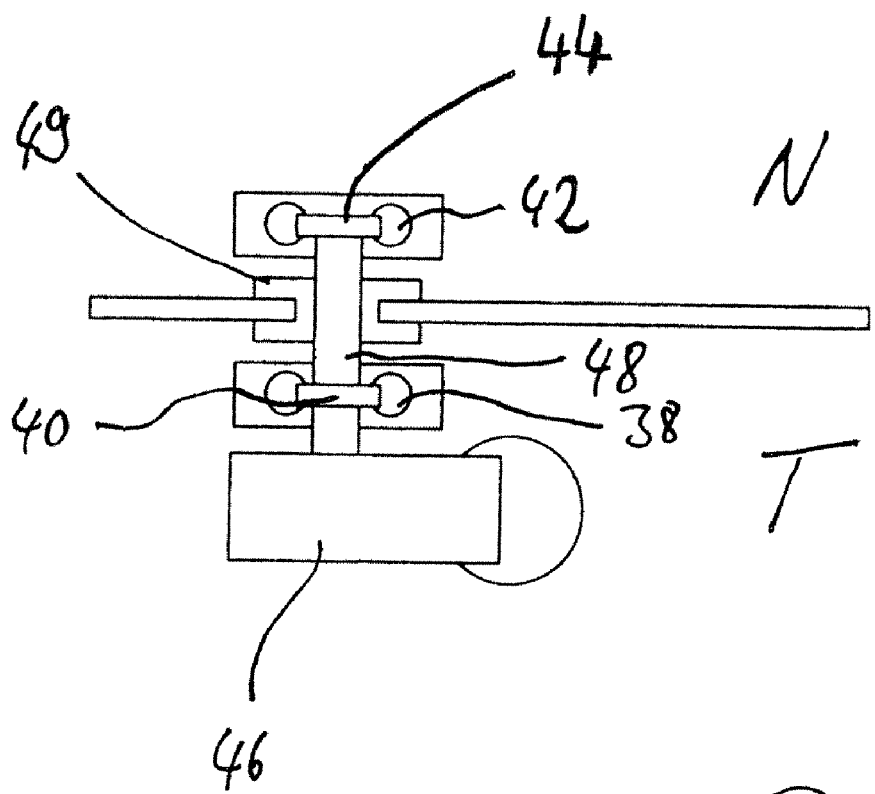
FIG. 5 shows a schematic view a drive device for the cover element.

As is apparent from FIG. 5, the roof opening system 12 has a drive motor 46 which is provided with a drive shaft 48 and which is arranged in the dry area T of the roof opening system 12. The first drive pinion 40 for the drive cables 38 of the front sliding elements 24 and the second drive pinion 44 for the drive cables 42 of the rear sliding elements 28 are seated on the drive shaft 48. The drive pinion 44 is arranged in the wet area N of the opening system. In order to seal the dry area T with respect to the wet area N, a rotational seal which engages around the drive shaft is provided, which rotational seal is arranged in the region of a sun roof frame through which the drive shaft 48 engages.

Arranged between the rear guide rails 32 and the front guide rails 30, which are respectively spaced apart from one another in the longitudinal direction of the vehicle, there is also a reinforcement element 50, which extends in the transverse direction of the vehicle.

Figure 2:
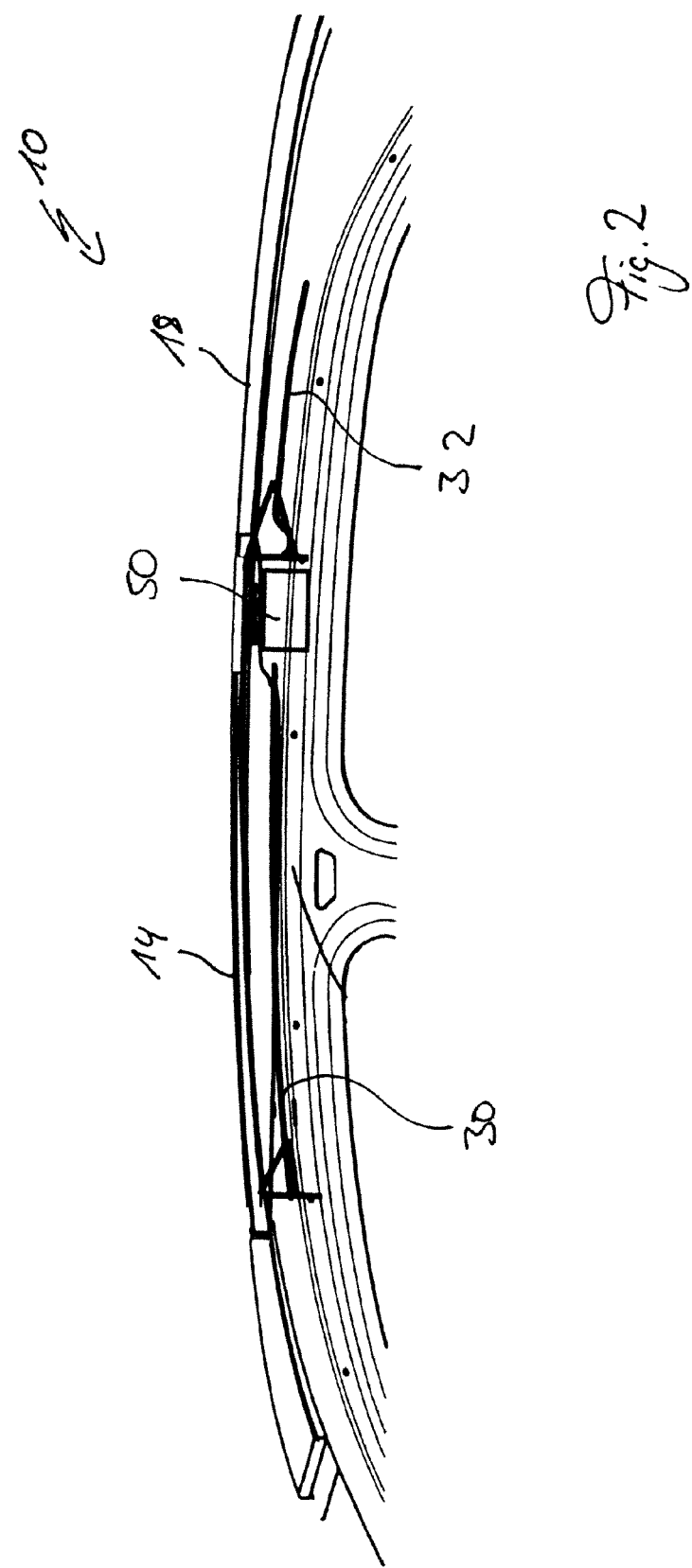
FIG. 2 shows a side view of the vehicle roof according to FIG. 1 with a cover element in a closed position.
Figure 3:
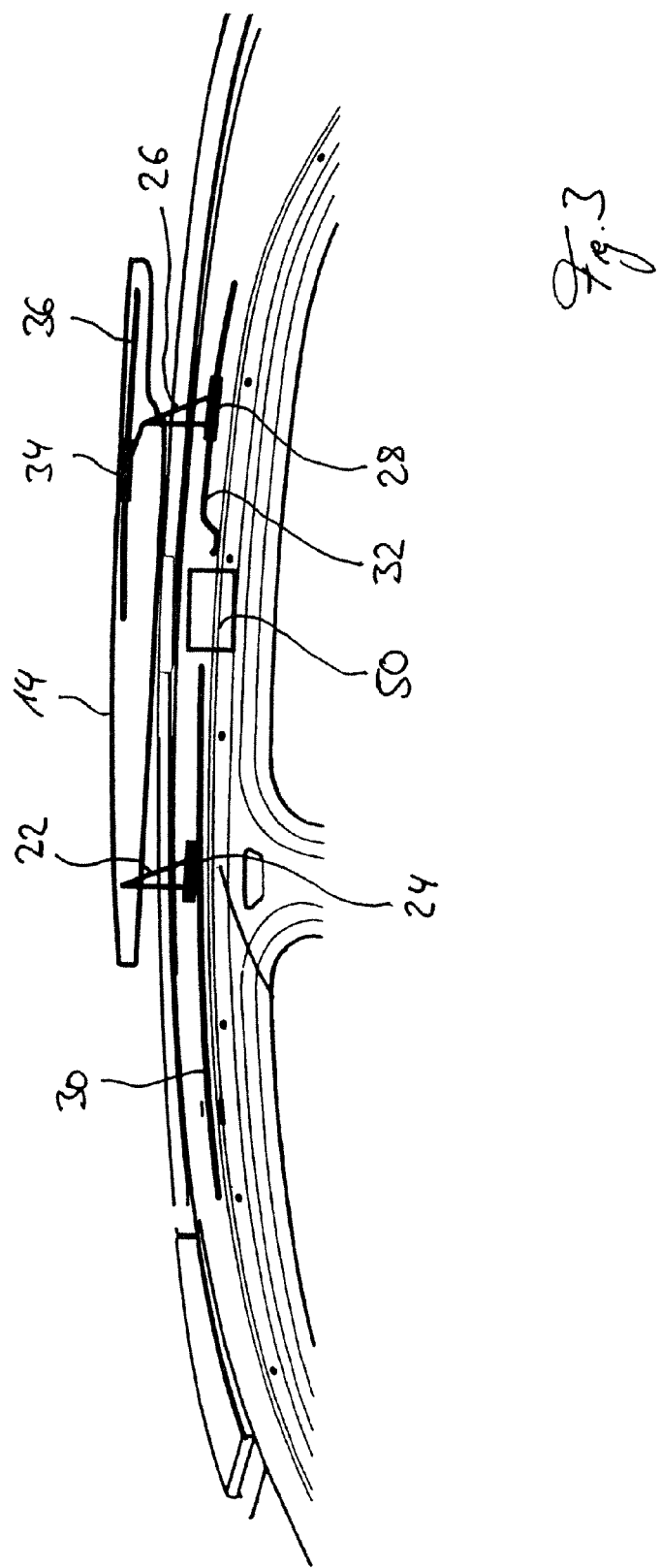
FIG. 3 shows a view corresponding to FIG. 2 but with a partially opened roof opening.
Figure 4:
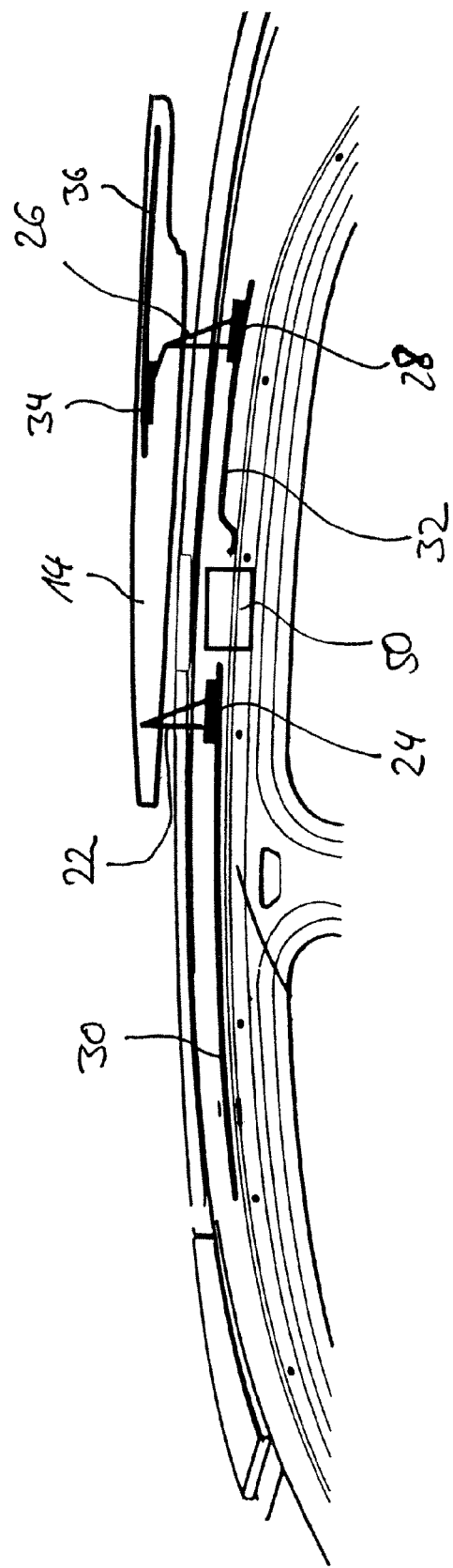
FIG. 4 shows a view corresponding to FIG. 2 but with a cover element in a maximum opening position.

As is apparent from FIGS. 2 to 4, when the roof opening 16 is opened by means of the sliding elements 24 and 28 which are each driven actively by means of the assigned drive cables 38 and 42, the cover element 14 is moved out of the closed position into the open position. In this context, the front sliding elements 24 are moved to the rear in the guide rails 30 which are arranged in the dry area T. The rear sliding elements 28 are moved to the rear at a relatively low speed in the rear guide rails 32 which are made shorter compared to the front guide rails 30. The difference in speed is determined by the diameters of the pinions 40 and 44 and predefined by different dimensions of the guide rails 30 and 32 in the longitudinal direction of the vehicle. In order to compensate the difference in speed, the cover element 14 is moved, with respect to the rear deployment lever 26, along the guide rail 36 which is fixed to the cover and which constitutes a travel compensation device.

Figure 6:
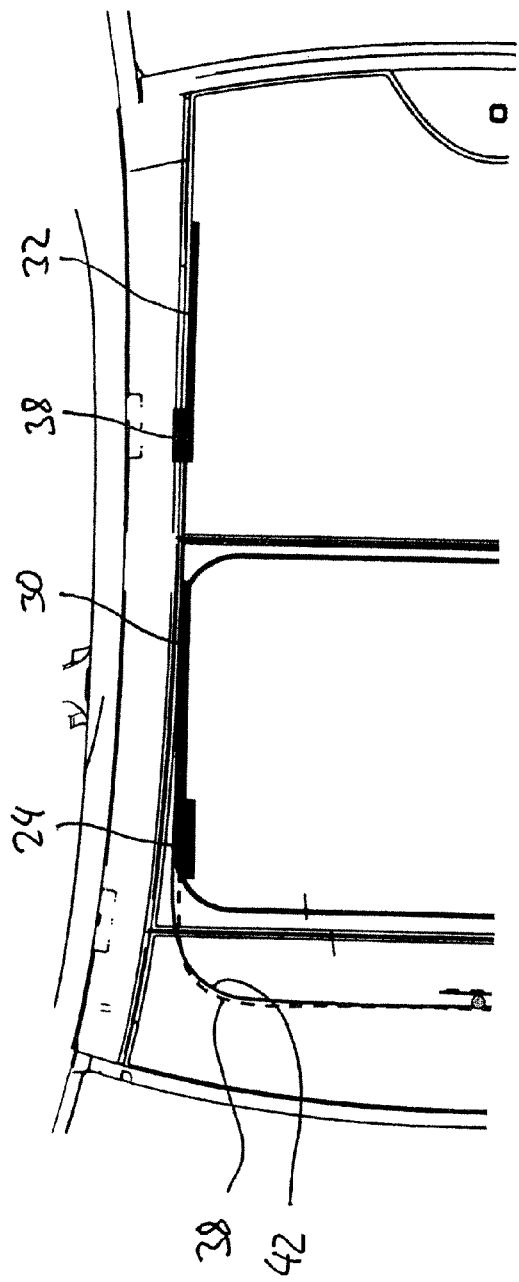
FIG. 6 shows a plan view of a second embodiment of a vehicle roof embodied according to the invention.
Figure 7:
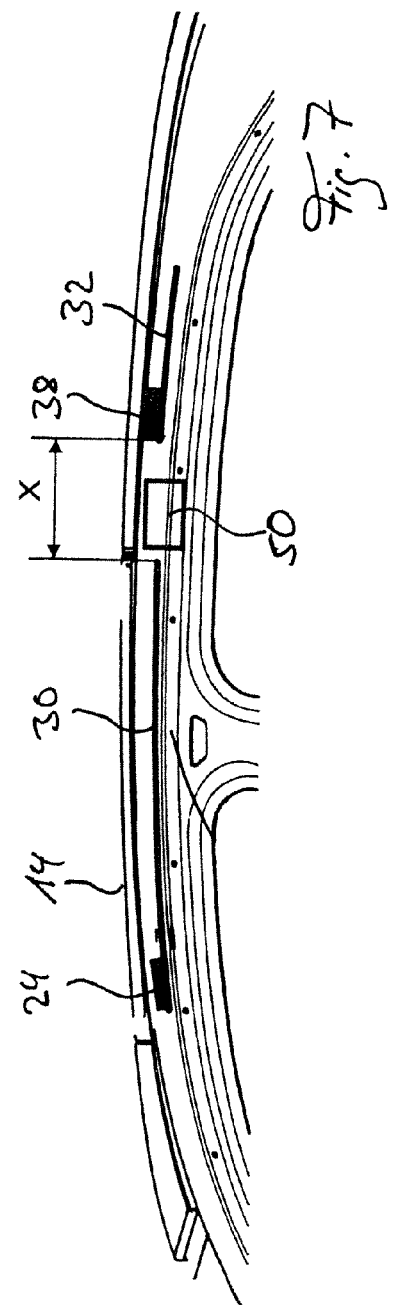
FIG. 7 shows a side view of the vehicle roof according to FIG. 6.

FIGS. 6 and 7 illustrate a second embodiment of a vehicle roof according to the invention, which vehicle roof corresponds essentially to that in FIGS. 1 to 5, but differs therefrom in that the front guide rails 30 for the front sliding elements 24 and the rear guide rails 32 for the rear sliding elements 28 are aligned with one another, that is to say lie essentially in one line. Between the guide rails 30 and 32 there is an intermediate space which has an extent x in the longitudinal direction of the vehicle and in which the reinforcement element 50 is integrated.

Figure 8:
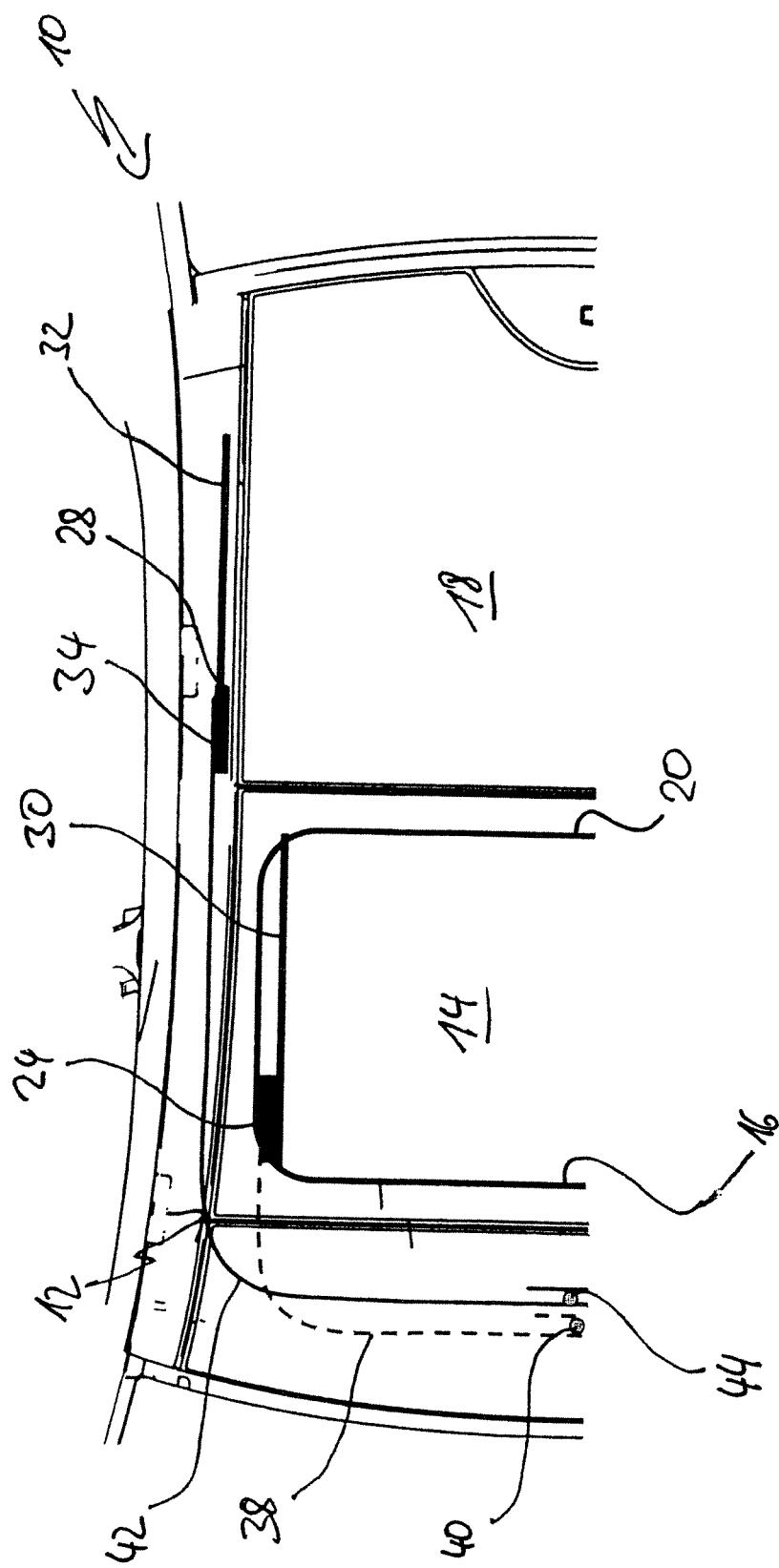
FIG. 8 shows a plan view of a third embodiment.

FIG. 8 illustrates a third embodiment of a vehicle roof according to the invention which in turn corresponds essentially to that according to FIGS. 1 to 5, but differs therefrom in that the drive pinions 40 and 44 are each seated on a separate drive shaft. These drive shafts may be a component of a branching transmission which is coupled to a drive motor or is respectively provided with a separate drive motor.

REFERENCE NUMERALS

| | |
|---|---|
| 10 | Vehicle roof |
| 12 | Roof opening system |
| 14 | Cover element |
| 16 | Roof opening |
| 18 | Roof section |
| 20 | Sealing profile |
| 22 | Front deployment lever |
| 24 | Front sliding element |
| 26 | Rear deployment lever |
| 28 | Rear sliding element |
| 30 | Front guide rail |
| 32 | Rear guide rail |
| 34 | Sliders |
| 36 | Guide element |
| 38 | Drive cable |
| 40 | Drive pinion |
| 42 | Drive cable |
| 44 | Drive pinion |
| 46 | Drive motor |
| 48 | Drive shaft |
| 49 | Rotational seal |
| 50 | Reinforcement element |

The invention claimed is:

1. A vehicle roof having a roof opening system comprising a cover element by which a roof opening can be optionally closed or at least partially opened and which interacts, in a closed position, with a separating device that surrounds the roof opening and separates a wet area from a dry area, wherein the cover element comprises, on opposite sides of the cover element with respect to a longitudinal central plane of the vehicle, a front, driven sliding element that lies in the dry area and is guided in a first guide device, and a rear sliding element that lies in the wet area and is guided in a second guide device, wherein the front sliding elements are connected to a first drive cable, the rear sliding elements are connected to a second drive cable, and the first and second drive cables are actively driven by a drive device so that said rear sliding elements move in the second guide devices.

2. The vehicle roof as claimed in claim 1, wherein the second drive cable is rigid in compression, is driven by the drive device, and is arranged in the wet area.

3. The vehicle roof as claimed in claim 1, wherein the rear sliding elements and the front sliding elements are driven by a common drive motor.

4. The vehicle roof as claimed in claim 3, wherein the drive motor lies in the dry area and has a drive shaft which is guided, in a sealed fashion into the wet area in order to drive the rear sliding elements.

5. The vehicle roof as claimed in claim 4, wherein a first pinion, which is arranged in the dry area, for driving the front sliding elements, and a second pinion, which is arranged in the wet area for driving the rear sliding elements are seated on the drive shaft, and a rotational seal is arranged between the first pinion and the second pinion.

6. The vehicle roof as claimed in claim 1, wherein the front sliding elements and the rear sliding elements are driven at different speeds during the adjustment of the cover element.

7. The vehicle roof as claimed in claim 6, wherein the different speeds are defined by the size of first and second pinions that are seated on a drive shaft of the drive motor.

8. The vehicle roof as claimed in claim 1, wherein the second guide devices for the rear sliding elements are each made shorter than the first guide devices for the front sliding elements, and a travel compensation device is provided.

9. The vehicle roof as claimed in claim 8, wherein the travel compensation device comprises on opposite sides of the longitudinal central plane of the vehicle, a guide rail, which is embodied on the cover element and on which a lever element, which is connected to the respective rear sliding element, is guided.

10. The vehicle roof as claimed in claim 1, wherein a roof reinforcement element, which extends in a transverse direction of the vehicle, is arranged between the first guide devices and the second guide devices.

11. The vehicle roof as claimed in claim 1, wherein the separating device is a sealing profile formed on the cover element or fixed to the roof.

12. The vehicle roof as claimed in claim 1, wherein the front and the rear guide devices of a cover element side are essentially aligned with one another in a longitudinal direction of the vehicle.

\* \* \* \* \*